United States Patent [19]

Stouffer

[11] Patent Number: 4,823,682
[45] Date of Patent: Apr. 25, 1989

[54] VEHICLE WINDSHIELD DEFROST APPARATUS WITH REDUCED DASHBOARD SPACE REQUIREMENTS

[75] Inventor: Ronald D. Stouffer, Silver Spring, Md.

[73] Assignee: Bowles Fluidics Corporation, Columbia, Md.

[21] Appl. No.: 522,884

[22] Filed: Aug. 12, 1983

[51] Int. Cl.⁴ ............................................. B60H 1/00
[52] U.S. Cl. ............................... 98/2.09; 237/12.3 A
[58] Field of Search ..................... 237/12.3 A, 12.3 R; 98/2.04, 2.09, 2.05; 137/829

[56] References Cited

U.S. PATENT DOCUMENTS 3,608,469  9/1971  Mutoh ................................. 98/2.09
3,832,939  9/1974  Kakie et al. ........................ 98/2.09

Primary Examiner—Henry A. Bennett
Attorney, Agent, or Firm—Jim Zegeer

[57] ABSTRACT

A vehicle windshield defrost system utilizes a fluidic oscillator for sweeping a jet of heated air across the windshield. The fluidic oscillator is of the type having an interaction chamber with sidewalls which converge to a common outlet to form a cross over type output region and thereby reduce the amount of space on the dashboard normally occupied by an output funnel.

4 Claims, 3 Drawing Sheets

VEHICLE WINDSHIELD DEFROST APPARATUS WITH REDUCED DASHBOARD SPACE REQUIREMENTS

BACKGROUND AND BRIEF DESCRIPTION OF THE INVENTION

Defrost systems for automobiles typically include a pair of funnel shaped diffuser outlet nozzles which receive heated air from a heating unit to uniformly diffuse and disperse the heated air upon a windshield. This requires two volumetrically large space occupying assemblies as well as two rather long diffuser outlets on the dashbord thereby occupying considerable space both on the dashboard and underneath. With downsized automobiles and impending advent of airbags mounted on the dash, this volumetric space, as well as the exterior space on the dashboard is at a premium. In Kakei et al U.S. Pat. Nos. 3,745,906 and 3,832,939 and in Stouffer U.S. Pat. No. 4,250,799, the defrost air stream is swept across the windshield to achieve better defrost operation and in Stouffer volumetric space underneath the windsheld is reduced through the use of a resilient reed oscillator. However, in these cases, the space occupied on the dashboard for admitting the sweeping airstream is rather lengthy and in the case of the fluidic oscillator disclosed in the Kakei et al patents, as well as the also disclosed auxillary electro-magnetically controlled sweep, these require electrical connections and/or volumetric space which is undesirable.

According to the present invention, the space requirements on the dashboard for sweeping defrost air are reduced by utilizing a fluidic oscillator having an interaction chamber wherein the sidewalls converge to the defrost air outlet and the defrost air is caused to sweep back and forth by a fluidics oscillator having no moving parts. The amount of space on the dashboard normally occupied by the output funnel of the typical defrost system is reduced significantly.

Accordingly, the basic object of the present invention is to reduce the amount of space occupied by the defrost outlet in the dashboard of vehicles such as automobiles, trucks and the like. Another object of the invention is to provide such a defrost system which is inexpensive, requires little underdash space, and which reduces the complexity of underdash defrost systems.

BRIEF DESCRIPTION OF THE DRAWINGS

The above and other objects, advantages and features of the invention will become more apparent when considered in light of the following specification and accompanying drawings wherein.

DETAILED DESCRIPTION

Figure 1A:
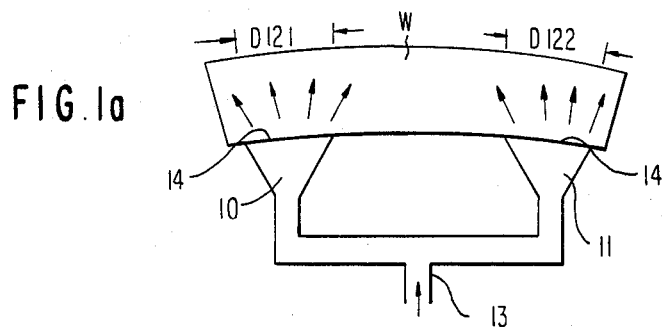
FIG. 1A is a schematic illustration of a typical prior art defrost system for windshields having two diffusing nozzle assemblies.

The typical prior art defrost system shown in FIG. 1A has a pair of funnel shaped diffusing nozzles 10 and 11, diffuser nozzle outlet 10 being on the driver's side and diffuser nozzle outlet 11 being on the passenger side, these nozzles typically having ductwork 12 connecting them to common supply 13 from a defrost air supply unit (not shown). Each diffuser nozzle typically will have diffuser 14 for uniformly dispersing and distributing the air on the windshield and these screens or louvers can typically cause significant losses in velocity so as to require larger blowers for assuring uniform defrosting at a relatively rapid or timely rate. The space occupied by two funnel shaped diffuser nozzles is indicated by $D_{14\text{-}1}$ and $D_{14\text{-}2}$.

In the Kakei et al U.S. Pat. Nos. 3,832,939 and 3,745,906, as diagramatically illustrated in FIG. 1B, the defrost nozzles 16 are funnel shaped leading from a wide outlet opening to a source of hot air which sprayed on the windshield in a fan shaped pattern through the outlet opening 17, the path of the fluid jet issuing from the defrost nozzle 16 being periodically shifted from one sidewall 18 to the other sidewall 19 of the funnel shaped defroster nozzle 16 with the funnel shaping used to provide a wall attachment effect between the air jet and the sidewalls of the defroster nozzle and occupying a length equal to the length of the wide funnel of the dashboard spaces D16-1 and D16-2. According to these patents, a number of different means can be utilized for achieving the sweeping action of the jet of defrost air, in one instance, a typical fluidic oscillator element is utilized to control the sweeping action so the device operates in a typical fluidic fashion. In other embodiments, shown in FIG. 1B, an electromagnetic system 15M controls the sweep of the fluidic oscillator and in another embodiment a motor sweeps a nozzle back and forth to cause the jet of defrosting air to be swept back and forth across the windwhield.

As noted in Stouffer U.S. Pat. No. 4,250,799, the extra space requirements for such devices in the small but crowded space under the typical automobile dashboard structure inhibits the use of standard fluidic oscillators with their long feedback channels so other techniques, such as use of magnetic controls 15M to control or feedback ports of an oscillator as also disclosed in said Kakei patents have been utilized. This use of a fluidic or mechanical oscillator to control the openings of the feedback passages likewise require significant space and/or structure complexity resulting in extensive design changes and dashboard manufacturing problems. The use of a motor for oscillating a vane or nozzle is likewise unduly complex requiring significant design departure and changes in the physical structure of the dashboard. Even oscillating the funnel itself or vanes in the device to cause the shifting of air or the valve element causing the shift or sweep of air, all require additional complex mechanism which add to cost, weight and complexity. In Stouffer U.S. Pat. No. 4,250,799, many if these problems are solved by the utilization of a resilient reed oscillator providing an air initiated oscillation mechanism which was extremely reliable, relatively low in cost and can be installed or incorporated in the existing defrost system without significant underdash strustural modification and reduced the space requirements to result in a much more efficient and rapid defrost of an automobile windsheld by concentrating the heat rather than diffusing it over a wide or long path. However, Stouffer U.S. Pat. No. 4,250,799 utilized one or more divergent funnel outlet nozzle occupying a length of dashboard space DIC.

Figure 1B:
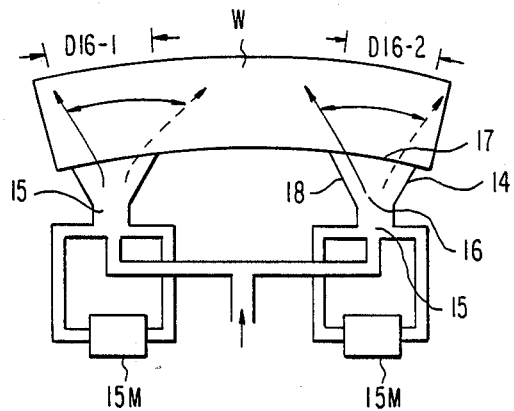
FIG. 1B is a schematic illustration of prior art as disclosed in the above referenced Kakei et al patents.
Figure 1C:
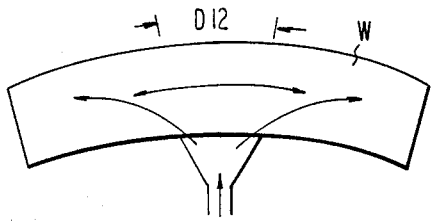
FIG. 1C is a schematic illustration of a prior art defrost system utilizing a resilient reed oscillator as disclosed in the above-referenced Stouffer patent.
Figure 2A:
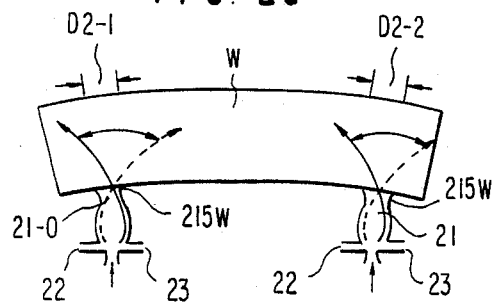
FIG. 2A is a schematic illustration of a vehicle defrost system for windshields incorporating the invention.
Figure 2B:
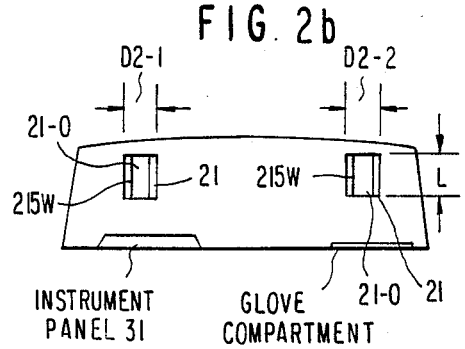
FIG. 2B is a top plan view thereof, FIG. 3 (and inset thereto) is an isometric prospective view of an automobile defrost system and its proximity to the windshield of an automobile to which the invention has been applied.
Figure 4:
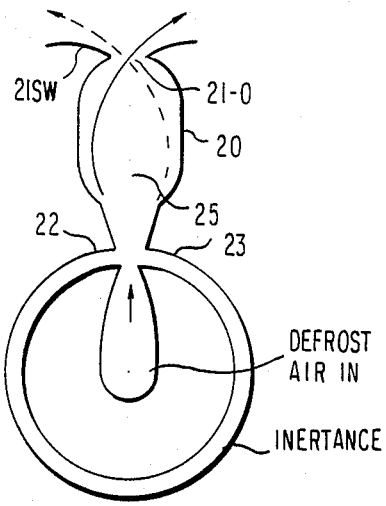
FIG. 4 is a schematic silhouette of a preferred form of the fluidic oscillator circuit utilized in this invention.
Figure 5:
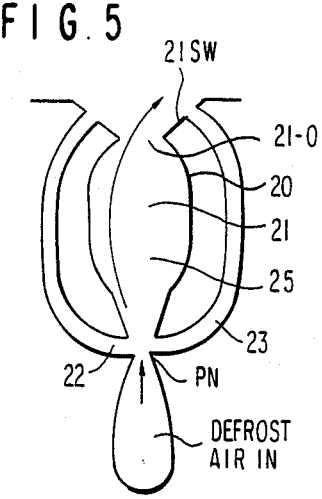
FIG. 5 is a schematic silhouette of a further fluidic oscillator which may be utilized in the practice of this invention.
Figure 6:
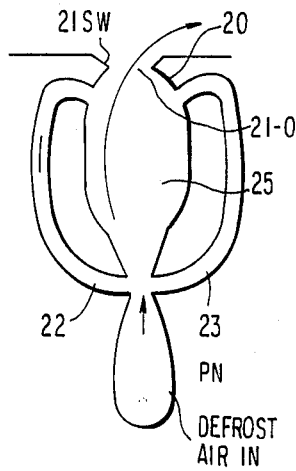
FIG. 6 is a schematic silhouette of a further fluidic oscillator circuit which may be utilized in the practicing of this invention.
Figure 7A:
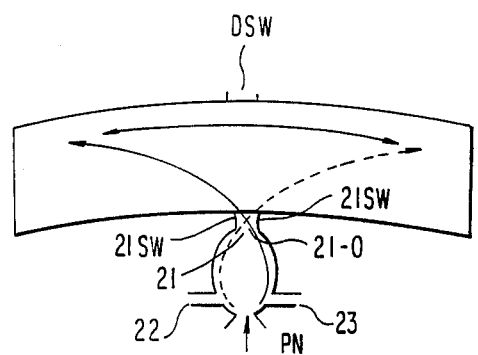
FIG. 7A illustrates a defrost outlet with reduced dashboard space requirements incorporating the invention and FIG. 7B is a top plan view thereof.
Figure 7B:
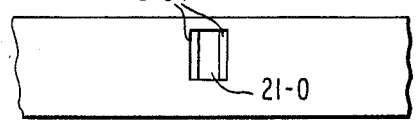

The present invention is schematically illustrated in FIG. 2A and FIG. 2B wherein fluidic oscillators 20 having a crossover output region 21 leading to a small outlet opening 21-0 with short walls 21-SW resulting in a dashboard space requirement which is significantly less than heretofore utilized. In this invention, the space or length D2 required for the output of the oscillator 20 is significantly less than the funnel mouth space $D_{1A\text{-}1}$ and $D_{1A\text{-}2}$ of FIG. 1A, the funnel mouth space $D_{1B\text{-}1}$ and $D_{1B\text{-}2}$ as shown in FIG. 1B for Kakei et al patents and the funnel mouth space $D_{1C}$ occupied by Stouffer reed type oscillator shown in FIG. 1C. The oscillator shown in FIG. 2 has the controls 22 and 23 unconnected but it will be appreciated that in the broader aspects of this invention the expanding output funnel shape is eliminated and the pivot for the sweeping air stream is just within the outlet opening 21-0, thus, the controls 22 and 23 may be connected to the atmosphere as shown in FIG. 5 and as disclosed in Stouffer et al U.S. Pat. No. 4,052,002, or they may be connected by means of an inortance loop, as shown in FIG. 4, or they may be coupled to the chamber 25 just in advance of the output region 21 as shown in FIG. 6 or they may be controlled in the various manners illustrated in the above-referenced Kakei et al patent.

In a typical fluidic oscillator the width of the outlet opening 21-0 is about $\frac{3}{4}$ inch and the power nozzle LN width W will be about $\frac{1}{2}$ inch so the outlet opening 21-0 in this example is about 1.5 W. The thickness T of the oscillator is about $2\frac{1}{4}$ inches and the length of the interaction chamber 25 can be about 5 to 9 W, the smaller, the better. The distance D-SW between ends of short walls 21-SW is about $1\frac{1}{4}$ inches.

Figure 3:
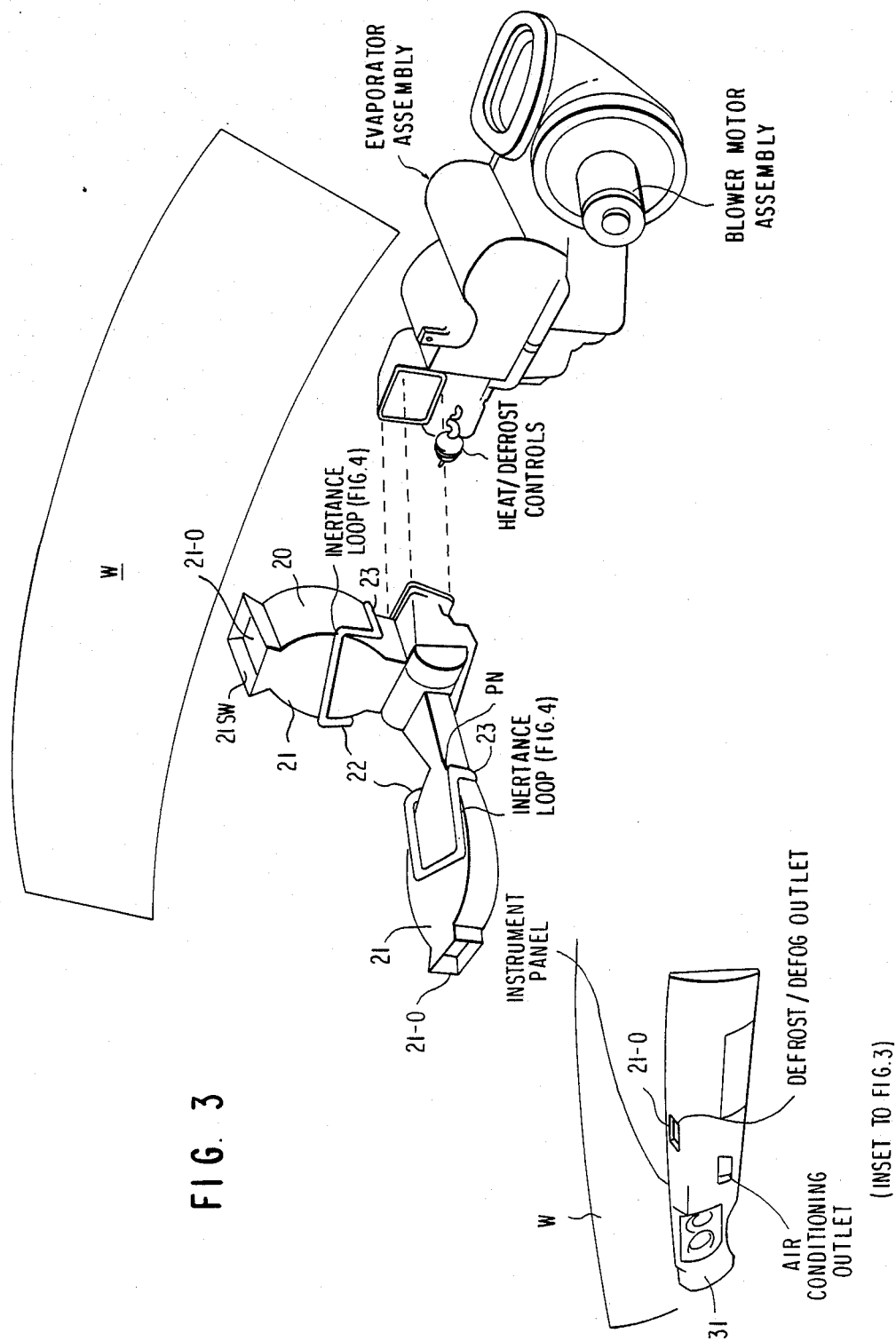

Referring now to FIG. 3, a defroster according to the invention includes a conventional heater 30 installed underneath the dashboard or instrument panel 31 and connected via main ductwork 32 to defrost defrost nozzle 20. The nozzle 20 is connected via ductwork 33 to main ductwork 34 but it will be appreciated that separate passageways or ducting may be utilized for connecting outlet nozzle to car heater 10 in the event that two nozzles are used. Nozzle 20 has an outlet opening 21-0 juxtaposed so as to direct air over the inner surface of windshield W.

While the outlet opening 21-0 can be reduced so as to pressurize (positive) the chamber relative to ambient as disclosed in Stouffer U.S. Pat. No. 4,052,002, it is preferred that the outlet opening 21-0 be more open such that the pressure in the chambers is negative relative to ambient.

A low impedance wire mesh or screen (not shown) can be used to keep objects from entering the outlet throat.

Air for heating the interior of the passageway compartment is delivered through a separate nozzle 35 for directing air through common duct to the interior compartment of the vehicle. It will be appreciated that controlling linkage and/or cables or controlling valving in duct 12 for directing 11 the air to the nozzle outlet 13 for defrost purposes and/or to the outlet nozzle 35 for heating the interior department of the vehicle are standard control instruments and hence do not form a part of the present invention. However, the control instrument shown in Stouffer U.S. Pat. No. 4,388,950 may be used to control the heat/defrost door for directing heated air through different channels.

Also shown in FIG. 3 is air conditioning outlet nozzle 36 which is connected to a conventional automobile air conditioning unit and air circulation system 37. It will be appreciated that heater outlet 35 can also be used for supplying air from the air conditioning unit to the passenger compartment. The air conditioner evaporator case as well as the blower motor and case are not illustrated in detail.

While the preferred embodiments of the invention have been shown and described, it is intended that modifications may be made by those skilled in the art without departing from the spirit and scope of the invention as defined in the attached claims.

What is claimed is:

1. In a vehicle defrost system, including a fluidic oscillator in the dashboard of said vehicle for sweeping a jet of defrost air across the interior surfaces of a vehicle windshield, said vehicle having a longitudinal axis, the improvement wherein said fluidic oscillator has a power nozzle and an interaction chamber defined by a pair of sidewalls which first diverge from said power nozzle and then converge to an outlet opening defined by said pair of sidewalls converging towards each other and being longer in a direction parallel to said longitudinal axis than in a direction transverse to said longitudinal axis, and the pivot for the sweeping of said jet is within said oscillator and proximate said outlet opening to thereby reduce the amount of open space of said outlet extending transverse of the longitudinal axis on said dashboard for issuing defrost air upon said windshield.

2. The invention defined in claim 1 wherein there is a driver and a passenger side of said vehicle windshield and said outlet opening is located proximate the center thereof.

3. The invention defined in claim 1 wherein there is a driver side and a passenger side of said vehicle windshield and there are two said fluidic oscillators, the outlet opening of one being centered proximate the center of the driver side and the outlet opening of the other being centered proximate the center of the passenger side.

4. In a vehicle windshield system in which a jet of defrost air issuing from a defrost air outlet opening is formed in the dashboard of a vehicle and is swept back and forth across the windshield, said vehicle having a longitudinal axis with said windshield and dashboard being transverse thereto, the improvement wherein the dimension of said defrost air outlet opening transverse to the longitudinal direction of said vehicle is narrower transverse to the longitudinal axis of said vehicle than it is parallel to said longitudinal axis and means for sweeping said defrost air in advance of said defrost air outlet so that said jet of defrost air arriving at said defrost air outlet opening arrives at successively different angles and, after reaching one extreme angle of deflection, reverses itself in an opposite direction, said means for sweeping said defrost air in advance of said defrost air outlet includes a fluidic oscillator, said fluidic oscillator having at least one interaction chamber, a defrost air inlet nozzle at one end of said interaction chamber, said defrost air outlet being at the opposite end of said chamber and sidewalls from said defrost air inlet to said defrost air outlet, said sidewalls including portions which diverge from said defrost air inlet at one end of said chamber and converge to said outlet to form said crossover type outlet at the opposite end of said chamber and thereby reduce the amount of space on said dashboard extending transversely of the longitudinal axis for delivering defrost air to said windshield.

* * * * *